(12) United States Patent
Ng et al.

(10) Patent No.: US 9,225,848 B2
(45) Date of Patent: Dec. 29, 2015

(54) METHOD OF OPERATING A NETWORK USING DIFFERENTIATED PRICING AND A NETWORK CONFIGURED TO OPERATE USING DIFFERENTIATED PRICING

(71) Applicant: Alcatel-Lucent USA Inc., Murray Hill, NJ (US)

(72) Inventors: Chris Ng, Rahway, NJ (US); Marcos Tavares, Ocean Township, NJ (US); Reinaldo Valenzuela, Holmdel, NJ (US); Gerard Foschini, Sayreville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 170 days.

(21) Appl. No.: 13/960,131

(22) Filed: Aug. 6, 2013

(65) Prior Publication Data

US 2015/0043347 A1  Feb. 12, 2015

(51) Int. Cl.
*H04W 24/08* (2009.01)
*H04W 28/02* (2009.01)
*H04M 15/00* (2006.01)
*H04L 12/863* (2013.01)

(52) U.S. Cl.
CPC ....... *H04M 15/8016* (2013.01); *H04L 47/6295* (2013.01); *H04W 24/08* (2013.01); *H04W 28/0236* (2013.01)

(58) Field of Classification Search
CPC ..... H04W 72/08; H04W 24/00; H04W 28/16; H04W 28/036; H04W 24/08; H04M 15/8016; H04L 47/6295
USPC ......................................... 370/252, 328, 329
See application file for complete search history.

(56) References Cited

U.S. PATENT DOCUMENTS

| 7,522,523 | B2 * | 4/2009 | Smallwood | H04L 12/5693 370/230.1 |
|---|---|---|---|---|
| 2002/0198850 | A1 * | 12/2002 | Grande et al. | 705/400 |
| 2003/0103525 | A1 * | 6/2003 | Wahl | 370/465 |
| 2006/0268793 | A1 * | 11/2006 | Zanaty | H04L 45/302 370/338 |
| 2010/0149971 | A1 * | 6/2010 | Noriega | 370/230 |
| 2013/0077503 | A1 * | 3/2013 | Chaudhuri | H04W 28/24 370/252 |
| 2014/0279136 | A1 * | 9/2014 | Pacella | H04L 41/5029 705/26.3 |
| 2014/0355439 | A1 * | 12/2014 | Kakadia | H04L 47/522 370/235 |

* cited by examiner

*Primary Examiner* — Chi H Pham
*Assistant Examiner* — Shailendra Kumar
(74) *Attorney, Agent, or Firm* — Harness, Dickey & Pierce, P.L.C.

(57) ABSTRACT

The method of operating a network includes receiving a measurement of total traffic intensity, receiving an expected quality of service associated with a packet, and assigning the packet to one of two or more priority queues based on the measurement of total traffic intensity and the expected quality of service, the two or more priority queues having different delay metrics.

16 Claims, 4 Drawing Sheets

S310 — Receiving measurement of total traffic intensity ($\lambda_b$)

S320 — Determining the traffic intensity associated with each priority queue ($\lambda_1, \lambda_2..., \lambda_N$) and a delay metric associated with each priority queue

FIG. 4

S410 — Receiving an expected quality of service for a mobile terminal

S420 — Assigning the mobile terminal to a priority queue based on the determined traffic intensity associated with each priority queue ($\lambda_1, \lambda_2..., \lambda_N$) and the expected quality of service for the mobile terminal

FIG. 5

METHOD OF OPERATING A NETWORK USING DIFFERENTIATED PRICING AND A NETWORK CONFIGURED TO OPERATE USING DIFFERENTIATED PRICING

BACKGROUND

The amount of data traffic generated by mobile terminals connected to wireless networks continues to increase as technology progresses. However, the revenue generated from the mobile terminals has not increased at the same pace as costs of serving the mobile terminals. Previous data plans offered unlimited data traffic for a flat rate, while current data plans offer tiers of data usage at varying prices that allow a fixed amount of data per month. Despite this change, the price that users of the mobile terminals are willing to pay per Megabyte of data traffic is decreasing and the revenue generated from the current fixed data plans may not offset the costs of growing and serving the wireless networks. More efficient methods of operating the wireless networks in order to increase revenue and/or decrease the cost of serving the mobile terminals are desired.

SUMMARY

At least one example embodiment is directed to a method of operating a network using differentiated pricing and/or a network configured to operate using differentiated pricing.

According to at least one example embodiment, a method of operating a network includes receiving a measurement of total traffic intensity; receiving an expected quality of service associated with a packet; and assigning the packet to one of two or more priority queues based on the measurement of total traffic intensity and the expected quality of service, the two or more priority queues having different delay metrics.

The method may include servicing the packet from the one of the two or more priority queues.

The method may include measuring the total traffic intensity, and the receiving receives the measured total traffic intensity.

The method may include determining a traffic intensity associated with each of the two or more priority queues and the delay metric associated with each of the two or more priority queues based on the measurement of total traffic intensity, and the assigning assigns the packet to the one of two or more priority queues based on the expected quality of service and the determined traffic intensity associated with each of the two or more priority queues.

The expected quality of service may include a requested priority from a user, the requested priority being two or more priority levels that the user selects.

The receiving the expected quality of service associated with the packet may include receiving an expected quality of service associated with a mobile terminal; receiving the packet from the mobile terminal; and associating the packet with the expected quality of service associated with the mobile terminal.

The method may include determining a price of service for the packet based on the determined the delay metric associated with the one of two or more priority queues.

The delay metric may be an average delay and the determining determines the average delay based on an average service time and an average waiting time.

The delay metric may be a P-th percentile delay and the determining determines the P-th percentile delay based on a probability approximation including a waiting time for the one of two or more priority queues, a number of components of a probability mass function (PMF) associated with a service time, and a resolution of the PMF associated with the service time.

The delay metric may be a truncated average delay approximation and the determining determines the truncated average delay approximation based on a waiting time for the one of two or more priority queues and a delay for the non-prioritized system.

According to at least one example embodiment, a network includes a queue controller configured to receive a measurement of total traffic intensity, to receive an expected quality of service associated with a packet, and to assign the packet to one of two or more priority queues based on the measurement of total traffic intensity and the expected quality of service, the two or more priority queues having different delay metrics.

The network may also include a buffer configured to service the packet from the one of two or more priority queues.

The network may also include a traffic intensity measurement device configured to measure the total traffic intensity and to transmit the total traffic intensity to the queue controller.

The queue controller may be further configured to determine a traffic intensity associated with each of the two or more priority queue and the delay metric associated with each of the two or more priority queues based on the measurement of total traffic intensity, and the queue controller is configured to assign the packet to the one of two or more priority queues based on the expected quality of service and the determined traffic intensity associated with each of the two or more priority queues.

The expected quality of service may include a requested priority from a user, the requested priority being two or more priority levels that the user selects.

The queue controller may be further configured to receive an expected quality of service associated with a mobile terminal, to receive the packet from the mobile terminal and to associate the packet with the expected quality of service associated with the mobile terminal.

The queue controller may be configured to determine a price of service for the packet based on the determined delay metric associated with the one of two or more priority queues.

The delay metric may be an average delay and the queue controller is configured to determine the average delay based on an average service time and an average waiting time.

The delay metric may be a P-th percentile delay and the queue controller is configured to determine the P-th percentile delay based on a probability approximation including a waiting time for the one of two or more priority queues, a number of components of a probability mass function (PMF) associated with a service time, and a resolution of the PMF associated with the service time.

The delay metric may be a truncated average delay approximation and the queue controller is configured to determine the truncated average delay approximation based on a waiting time for the one of two or more priority queues and a delay for the non-prioritized system.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which some example embodiments are shown. Example embodiments may, however, be embodied in many different forms and should not be construed as being limited to the example embodiments set forth herein; rather, these example embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that, although the terms "first", "second", etc. may be used herein to describe various elements, components, and/or sections, these elements, components, and/or sections should not be limited by these terms. These terms are only used to distinguish one element, component or section from another element, component, or section. Thus, a first element, component, or section discussed below could be termed a second element, component, or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some example embodiments will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain some illustrative example embodiments. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used herein, the term "mobile terminal" may be considered synonymous to, and may hereafter be occasionally referred to, as a phone, wirelessly equipped laptop, a mobile, mobile unit, mobile user, subscriber, user, remote station, access terminal, receiver, etc., and may describe a remote user of wireless resources in a wireless network. The term "base station" (BS) may be considered synonymous to and/or referred to as a base transceiver station (BTS), Node B, etc. and may describe equipment that provides data and/or voice connectivity between a wireless network and one or more users.

Figure 1:
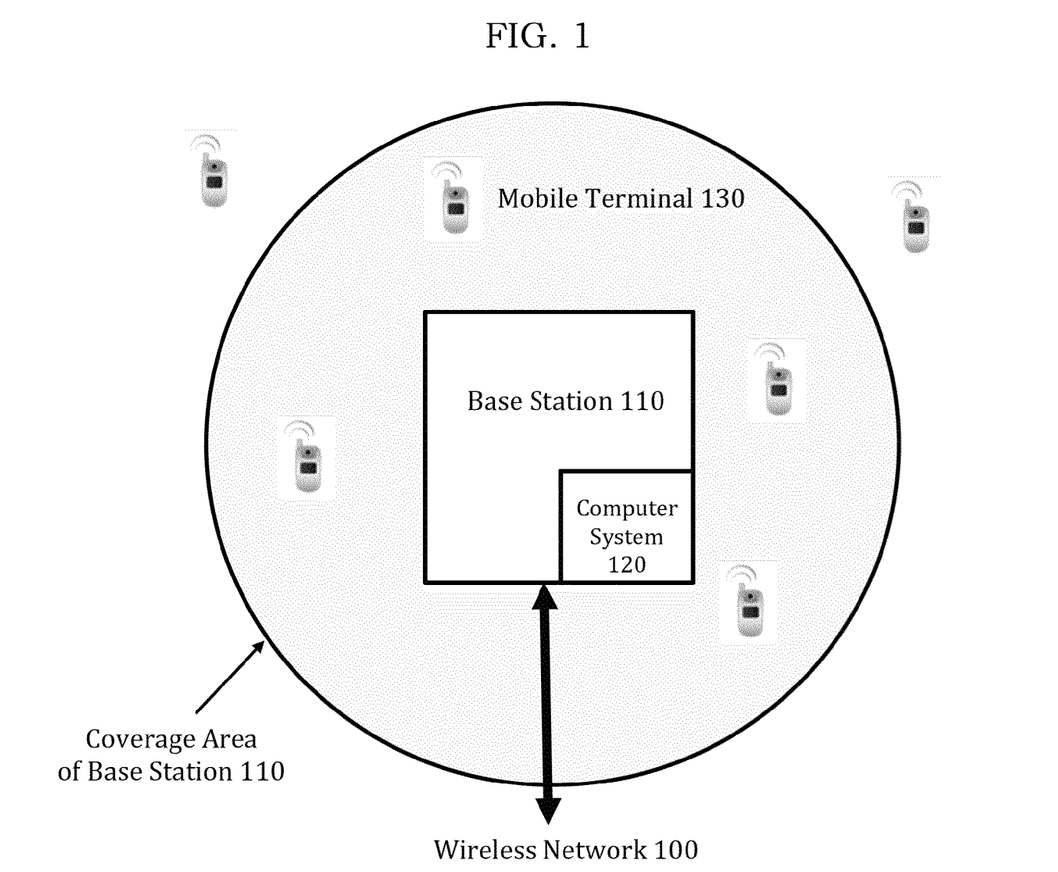
FIG. 1 illustrates a base station that includes a computer system, the base station connecting mobile terminals in a coverage area of the base station to a wireless network, according to some example embodiments.

FIG. 1 illustrates a base station 110 that includes a computer system 120, the base station 110 connecting mobile terminals 130 in a coverage area of the base station 110 to a wireless network 100, according to some example embodiments.

When a mobile terminal 130 is connected to the base station 110, the mobile terminal 130 may send a data request to wirelessly exchange packets of data with the base station 110. For example, the mobile terminal 130 may send a data request to wirelessly send packets of data to the base station 110 to upload data or send a data request to wirelessly receive packets of data from the base station 110 to download data. The base station 110 may relay the packets of data to the wireless network 100 or a larger network, such as the internet. The base station 110 may receive packets of data from the wireless network 100 or the larger network and relay the received packets of data to the mobile terminal 130. The computer system 120 may control the relay of data packets, as discussed below with regard to FIGS. 2-3.

The example embodiments illustrated in FIG. 1 show a single base station 110 that includes a computer system 120. However, example embodiments are not limited thereto, and a base station 110 may be collocated with an external computer system 120 or multiple base stations 110 may be in communication with a single computer system 120.

Figure 2:
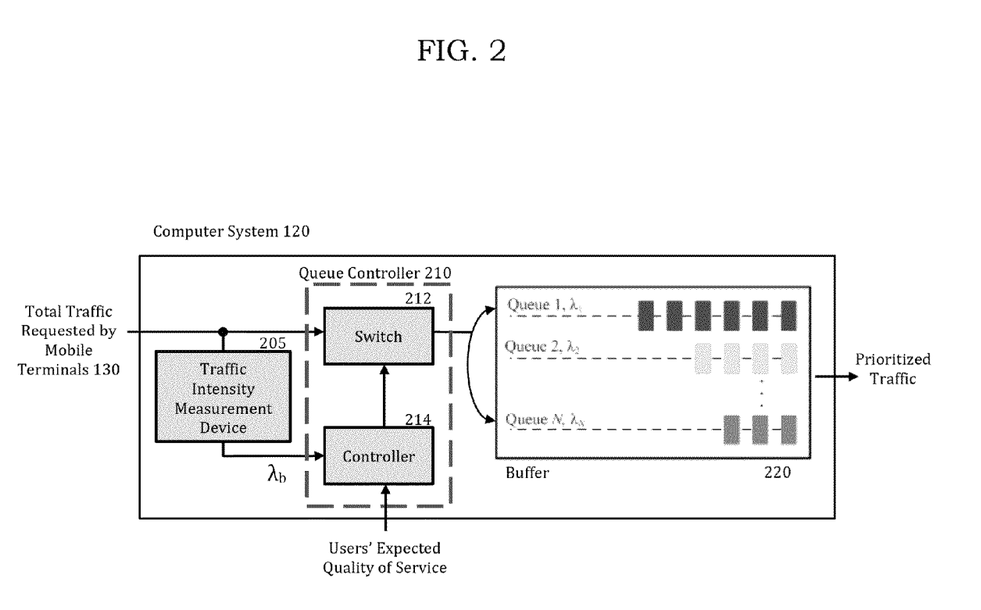
FIG. 2 illustrates an example structure of the computer system, according to some example embodiments.

FIG. 2 illustrates an example structure of the computer system 120, according to some example embodiments. The computer system 120 may include a traffic intensity measurement device 205, a queue controller 210 and a buffer 220. The queue controller 210 may include a switch 212 and a controller 214.

The total traffic requested by mobile terminals 130 is input to the computer system 120. The total traffic requested by mobile terminals 130 may include all data requests by mobile terminals 130 within a coverage area of the base station 110 to upload or download packets of data. The traffic intensity measurement device 205 may measure the total traffic requested by mobile terminals 130 and provide the controller 214 with a measurement of the total traffic intensity ($\lambda_b$). The measurement of total traffic intensity ($\lambda_b$) may be in packets/second, Megabytes/second or other measurements for a rate of data.

The controller 214 may receive an expected quality of service for all mobile terminals 130 active in the coverage area of the base station 110. A mobile terminal 130 is considered active if the mobile terminal 130 is connected to the base station 110.

Based on the expected quality of service for a mobile terminal 130, the controller 214 may associate one of several priority queues with the mobile terminal 130. The switch 212 may assign data requests from the mobile terminal 130 to the priority queue associated with the mobile terminal 130.

The buffer 220 may buffer the assigned data requests until the assigned data requests are serviced and the data requests or packets may be serviced based on the priority queue. For example, the buffer 220 may service all of the data requests or packets in the first priority queue before servicing any of the data requests or packets in the second priority queue.

The computer system 120 may output prioritized traffic, which indicates the order in which each data request from the mobile terminals 130 will be serviced or processed by the base station 110.

Figure 3:
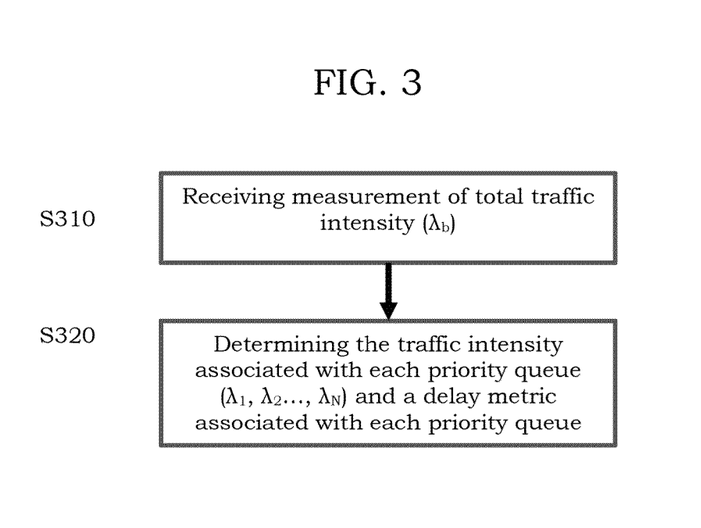
FIG. 3 is a flowchart illustrating a method of determining the traffic intensity associated with each priority queue and a delay metric associated with each priority queue, according to some example embodiments.

FIG. 3 is a flowchart illustrating a method of determining the traffic intensity associated with each priority queue and a delay metric associated with each priority queue, according to some example embodiments.

In S310, the queue controller 210 may receive a measurement of the total traffic intensity ($\lambda_b$). For example, the queue controller 210 may receive a measurement of the total traffic intensity ($\lambda_b$) from the traffic intensity measurement device 205. Alternatively, the queue controller 210 may receive a measurement of the total traffic intensity ($\lambda_b$) from a source external to the computer system 120, such as from the base station 110 or from another device in the wireless network 100. As discussed above, the total traffic intensity ($\lambda_b$) may be a measurement [for example, packets/second] of the total traffic requested by mobile terminals 130 including all data download requests or data upload requests.

In S320, the queue controller 210 may determine the traffic intensity associated with each priority queue ($\lambda_1, \lambda_2 \ldots, \lambda_N$) and a delay metric associated with each priority queue. The delay metric associated with each priority queue may be based on the traffic intensities associated with each priority queue ($\lambda_1, \lambda_2 \ldots, \lambda_N$) and may indicate a delay time for an individual data request to be serviced. For example, the total traffic intensity ($\lambda_b$) may be fragmented and its fractions may be assigned to four different priority queues ($\lambda_1, \lambda_2, \lambda_3, \lambda_4$). The sum of traffic intensities associated with each priority queue ($\lambda_1, \lambda_2, \lambda_3, \lambda_4$) is equal to the total traffic intensity ($\lambda_b$). Based on the traffic intensity associated with each priority queue ($\lambda_1, \lambda_2, \lambda_3, \lambda_4$), each priority queue may have a different delay metric.

The queue controller 210 may determine the traffic intensity associated with each priority queue ($\lambda_1, \lambda_2 \ldots, \lambda_N$) using the equations discussed below with reference to Pricing Policies 1-3. Pricing Policies 1-3 may relate a delay metric associated with each priority queue with a price of service, as will be discussed in greater detail below. The traffic intensity associated with each priority queue ($\lambda_1, \lambda_2 \ldots, \lambda_N$) may be used as the optimal distribution of mobile terminals 130 amongst the priority queues. For example, the queue controller 210 may determine that the optimal distribution of mobile terminals 130 among the priority queues is 40% in a first priority queue, 27% in a second priority queue, 19% in a third priority queue and 14% in a fourth priority queue based on the traffic intensity associated with each priority queue ($\lambda_1, \lambda_2 \ldots, \lambda_N$) calculated using Pricing Policy 2. Use of the determined optimized distribution will be discussed in greater detail below with reference to S420 of FIG. 4.

The queue controller 210 may determine the delay metric associated with each priority queue using the equations discussed below with reference to Pricing Policies 1-3. The delay metric may depend on which Pricing Policy is chosen. For example, the delay metric may depend on a waiting time and a service time. The waiting time is the time spent by a data request in the buffer 220 prior to being serviced, while the service time is the time required for servicing the data request. The waiting time may depend on a quantity of data requests already in the priority queue and a quantity of data requests in any priority queue with a higher priority.

The queue controller 210 may determine the traffic intensity associated with each priority queue ($\lambda_1, \lambda_2 \ldots, \lambda_N$) and the delay metric associated with each priority queue periodically. For example, the queue controller 210 may determine these values every 10 milliseconds, or the queue controller 210 may determine these values every 10 minutes. However, example embodiments are not limited thereto, and the queue controller 210 may use any desired period of time. Alternatively, the queue controller 210 may determine these values dynamically. However, determining the values dynamically may consume more resources.

As an alternative to using the equations of Pricing Policies 1-3, the queue controller 210 may determine the traffic intensity associated with each priority queue ($\lambda_1, \lambda_2 \ldots, \lambda_N$) and the delay metric associated with each priority queue based on a lookup table. For example, the equations discussed below with reference to Pricing Policies 1-3 may be solved and quantized in the lookup table, and the queue controller 210 may find the traffic intensity associated with each priority queue ($\lambda_1, \lambda_2 \ldots, \lambda_N$) in the lookup table based on the total traffic intensity ($\lambda_b$). As an example, the lookup table may have a range of traffic intensities ($\lambda_b$) from 1 MB/s to 100 MB/s, with a quantization of 1 MB/s. Thus, if the total traffic intensity ($\lambda_b$) is between 1-2 MB/s, the lookup table may provide a first traffic intensity associated with each priority queue ($\lambda_1, \lambda_2 \ldots, \lambda_N$), whereas if the total traffic intensity ($\lambda_b$) is between 2-3 MB/s, the lookup table may provide a second traffic intensity associated with each priority queue ($\lambda_1, \lambda_2 \ldots, \lambda_N$).

Figure 4:
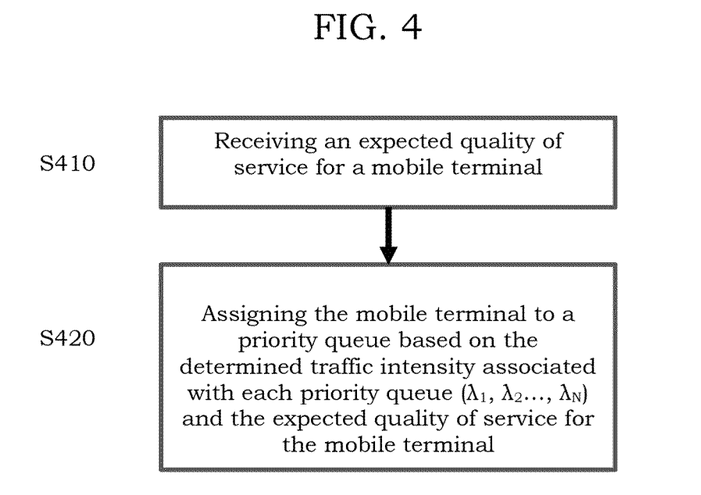
FIG. 4 is a flowchart illustrating a method of assigning each mobile terminal to a priority queue, according to some example embodiments.

FIG. 4 is a flowchart illustrating a method of assigning each mobile terminal to a priority queue, according to some example embodiments.

The queue controller 210 may receive an expected quality of service in S410. For example, the queue controller 210 may receive an expected quality of service from any active mobile terminals 130 connected to the base station 110. A list of all active mobile terminals 130 connected to the base station 110 may be included in a table stored in the base station 110. Alternatively, the list of all active mobile terminals may be included in a table stored elsewhere in the wireless network 100.

The expected quality of service may be included with a data request or data packet from the mobile terminal 130 or the expected quality of service may be received separately and associated with the mobile terminal 130. The expected quality of service may be based on the data plan associated with the mobile terminal 130 or, alternatively, the expected quality of service may be based on a requested priority from a user of the mobile terminal 130, the requested priority being two or more priority levels that the user selects.

The expected quality of service may be, for example, a unitless value that the mobile terminal 130 requests indicating a level of importance of shorter delays or lower prices. For example, the expected quality of service associated with the mobile terminal 130 may be a priority level from 1-100 based on the price a user of the mobile terminal 130 wants to pay or the delay the user wants to experience, with 1 indicating the mobile terminal 130 is requesting the longest delay (and therefore lowest price) and 100 indicating the mobile terminal 130 is requesting the shortest delay (and therefore highest price). Example embodiments are not limited thereto, and the expected quality of service may be based on other methods. The process of setting prices for service is discussed in greater detail below with regard to Pricing Policies 1-3.

If the expected quality of service is based on the data plan associated with the mobile terminal 130, all data packets or data requests from the mobile terminal 130 may have the same expected quality of service. Therefore, the queue controller 210 may associate this expected quality of service with every data request from the mobile terminal 130.

Alternatively, if the expected quality of service is based on a requested priority from a user of the mobile terminal 130, the user may dynamically change the expected quality of service based on a desired speed or importance. For example, the user may request a higher priority while performing work-related functions and request a lower priority while performing non-work-related functions. The higher priority will offer faster service, but the price of service will increase accordingly, as discussed below with regard to Pricing Policies 1-3.

The queue controller 210 may store the expected quality of service associated with the mobile terminal 130 or communicate with the base station 110 or another device to determine the expected quality of service associated with the mobile terminal 130.

In S420, the queue controller 210 may assign a first mobile terminal 130 to a priority queue based on the measurement of total traffic intensity ($\lambda_b$) and the expected quality of service for the first mobile terminal 130. For example, the queue controller 210 may use the traffic intensity associated with each priority queue ($\lambda_1, \lambda_2 \ldots, \lambda_N$) determined in S320 as the optimal distribution of mobile terminals 130 amongst the priority queues. Based on the optimal distribution of mobile terminals 130 amongst the priority queues, the queue controller 210 may compare the expected quality of service for the first mobile terminal 130 with the expected quality of service of all other mobile terminals 130 to assign the first mobile terminal 130 to a particular priority queue.

As an example, the queue controller may determine that the optimal distribution of mobile terminals 130 has 40% of the mobile terminals 130 assigned to a first priority queue. If the expected quality of service for the first mobile terminal 130 is in the top 30% of expected quality of services for all active mobile terminals 130, the queue controller 210 may assign the first mobile terminal 130 to the first priority queue. However, if the expected quality of service for the first mobile terminal 130 is between 50% and 60% of expected quality of services for all active mobile terminals 130, the queue controller 210 may assign the first mobile terminal 130 to the second priority queue.

As discussed above with reference to S320 and below with reference to Pricing Policies 1-3, the optimal distribution of mobile terminals 130 may vary depending on the Pricing Policy or delay metric used. Moreover, the queue controller 210 may rely on a lookup table or may calculate the traffic intensity associated with each priority queue ($\lambda_1, \lambda_2 \ldots, \lambda_N$) as necessary. If using the lookup table, the queue controller 210 may use the measured total traffic intensity ($\lambda_b$) to determine the optimal distribution and/or an estimated delay metric associated with each priority queue.

Figure 5:
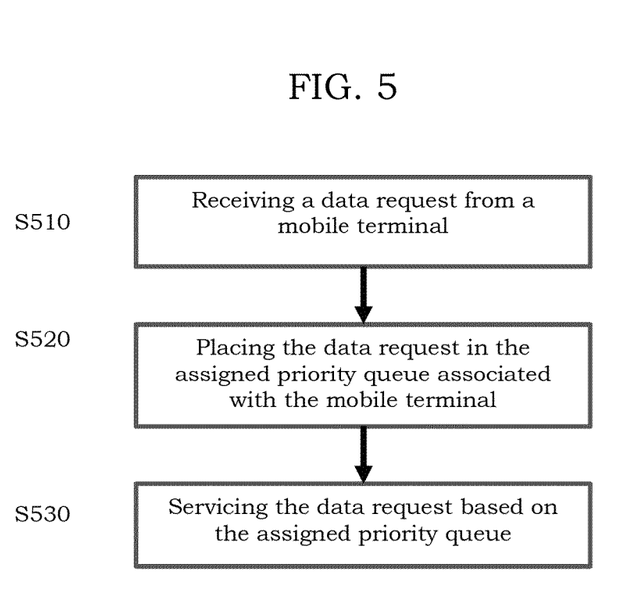
FIG. 5 is a flowchart illustrating a method of placing a data request from a mobile terminal in the assigned priority queue associated with the mobile terminal, according to some example embodiments.

FIG. 5 is a flowchart illustrating a method of placing a data request from a mobile terminal 130 in the assigned priority queue associated with the mobile terminal 130, according to some example embodiments.

In S510, the queue controller 210 may receive a data request from a mobile terminal 130, such as a data request to upload or download packets of data. In S520, the queue controller may place the data request in the priority queue associated with the mobile terminal 130 that was assigned in S420. In S530, the buffer 220 may service the data request based on the assigned priority queue.

As an example, the queue controller 210 may receive a first data request from a first mobile terminal 130. Previously, the first mobile terminal 130 was assigned to the first priority queue. Therefore, the queue controller 210 may place the first data request from a first mobile terminal 130 in a first priority queue in the buffer 220. As the first data request is in the first priority queue, as soon as all data request already in the first priority queue are serviced, the buffer 220 may service the first data request.

As discussed above referring to S410, a user of the mobile terminal 130 may dynamically change the expected quality of service based on a desired speed or importance. Therefore, the queue controller 210 may receive a second expected quality of service from the mobile terminal 130 and assign the mobile terminal 130 to a second priority queue simultaneously to performing steps S510-S530. Thus, a second data request from the first mobile terminal 130 may be placed in a different priority queue from the first data request from the first mobile terminal 130. Example embodiments are not limited thereto, and the queue controller 210 may move the first data request to a different priority queue if the mobile terminal 130 is assigned to a different priority queue prior to the first request being serviced by the buffer 220.

The buffer 220 may service the data requests or packets based on the priority queue. For example, the buffer 220 may service all of the data requests or packets in the first priority queue before servicing any of the data requests or packets in the second priority queue. Similarly, the buffer 220 may service all of the data requests or packets in the second priority queue before servicing any of the data requests or packets in the third priority queue. In this way, the higher the priority queue, the faster the buffer 220 services the data requests or packets. This is an example of a delay system.

Due to the delay system, a delay metric associated with each priority queue may depend on the total traffic intensity ($\lambda_b$) and may indicate a delay time for an individual data request to be serviced. For example, because the buffer 220 may service all of the data requests or packets in the first priority queue before servicing any of the data requests or packets in the second priority queue, the second priority queue has a delay due to the number of data requests or packets currently in the first priority queue and any additional data requests or packets received by the first priority queue. If the total traffic intensity ($\lambda_b$) is low, which may reflect a low load on the base station 110, the last priority queue may have a delay metric similar to a delay metric for the first priority queue. However, if the total traffic intensity ($\lambda_b$) is high, which may reflect a high load on the base station 110, the last priority queue may have a delay metric far longer than a delay metric for the first priority queue.

Non-preemptive priority queues or preemptive priority queues may be used. In a priority queue, a data request with a lower priority is only serviced when there are no data requests with higher priority levels in the system. In a non-preemptive system, once the processing of a data request or packet has started, it is allowed to carry on to completion even if data requests or packets of higher priority levels arrive at the system in the intervening time. In contrast, a preemptive system immediately suspends the processing of a lower-priority data request or packet when a high-priority data request or packet arrives.

As discussed above, a delay metric associated with each priority queue may be used to calculate a price of service for each data request, as will be discussed in greater detail below with reference to Pricing Policies 1-3.

Price of Service

The computer system 120 may translate typical network quantities, such as delay in seconds, into monetary quantities, such as $/packet or $/Byte. To calculate the price of service, the computer system 120 may consider revenue to be proportional to a total traffic intensity ($\lambda_b$) over the delay metric, the total traffic intensity ($\lambda_b$) being the rate at which data requests arrive at the computer system 120.

$$\text{Revenue} \propto \frac{\text{Total Traffic Intensity}(\lambda_b)}{\text{Delay Metric}} \quad (1)$$

Similarly, the queue controller 210 may determine a price of service of a single data request based on the delay metric of the assigned priority queue for the data request. For example, the computer system 120 may use an inverse pricing function, such as $P_n = c/T_n$, where $P_n$ is the price for a packet [$/packet], $T_n$ is the delay [seconds] and c is a scalar constant for the network [$·seconds/packet].

Below, three examples of potential pricing policies used to define the delay metric and corresponding price of service for each data request are discussed. Based on the pricing policy, the distribution of the mobile terminals 130 in each priority queue may be optimized to increase revenue or reduce future network expansion costs by reducing bandwidth from the baseline system. For example, the traffic intensity associated with each priority queue ($\lambda_1, \lambda_2, \ldots, \lambda_N$) calculated using Pricing Policies 1-3 may be used as the optimal distribution of mobile terminals 130 amongst the priority queues. The optimized distributions are determined in S320 and used in S420, discussed in greater detail above.

Pricing Policy 1—Average Delay:

For example, the average delays $T_n$ for the priority queues $n=1, 2, \ldots, N$ may be used as the delay metrics. As is discussed in greater detail below with reference to equations (2)-(8), the queue controller 210 may determine the average delay based on an average service time and an average waiting time.

Pricing Policy 2—P-th percentile Delay:

For example, the P-th percentile delays $T_n^P$ for the priority queues $n=1, 2, \ldots, N$ may be used as the delay metrics. As is discussed in greater detail below with reference to equations (10)-(14), the queue controller 210 may determine the P-th percentile delay based on a probability approximation, which may include a waiting time for the priority queues, a number of components of a probability mass function (PMF) associated with a service time, and a resolution of the PMF associated with the service time.

Pricing Policy 3—Percentile Truncated Average Delay:

For example, the truncated average delays $T_n^P$ for the priority queues $n=1, 2, \ldots, N$ up to the P-th percentile delay of the baseline non-prioritized system may be used as the delay metrics. As is discussed in greater detail below with reference to equations (15)-(21), the queue controller 210 may determine the percentile truncated average delay approximation based on a waiting time for the priority queues and a delay for the non-prioritized system.

Pricing Policy 1: Average Delay

From a network operator perspective, the variables that can be controlled to achieve the desired results with respect to revenues are the fractional traffic intensities ($\lambda_1, \lambda_2, \ldots, \lambda_N$) impinging on the distinct priority queues. Therefore, Policy 1 uses the average delays $T_1, T_2, \ldots, T_N$ as variables of the utility function:

$$\text{maximize } U(\lambda_1, \ldots, \lambda_N, T_1, \ldots, T_N) = c \sum_{i=1}^{N} \frac{\overbrace{\lambda_i}^{\text{Revenue}}}{T_i} \quad (2)$$

over $$\lambda_n \in \mathbb{R}^+, n = 1, \ldots, N \quad (3)$$

subject to:

$$\sum_{i=1}^{N} \lambda_i = \lambda_b \quad (4)$$

$$B = \alpha \cdot B_b, 0 < \alpha \le 1 \quad (5)$$

$$T_n = \underbrace{\overline{X_n}}_{\text{Average Service Time}} + \underbrace{\frac{\sum_{i=1}^{N}(\lambda_i \cdot \overline{X_i^2})}{2 \cdot \left[1 - \sum_{i=1}^{n-1}(\lambda_i \cdot \overline{X_i})\right] \cdot \left[1 - \sum_{i=1}^{n}(\lambda_i \cdot \overline{X_i})\right]}}_{\text{Average Waiting Time}}, \quad (6)$$

$$n = 1, \ldots, N,$$

$$\overline{X_n} = \mathrm{E}\left\{\frac{F}{B \cdot S}\right\} = \frac{F}{B} \cdot \mathrm{E}\left\{\frac{1}{S}\right\}, n = 1, \ldots, N \quad (7)$$

$$\overline{X_n^2} = \mathrm{E}\left\{\left(\frac{F}{B \cdot S}\right)^2\right\} = \frac{F^2}{B^2} \cdot \mathrm{E}\left\{\left(\frac{1}{S}\right)^2\right\}, n = 1, \ldots, N. \quad (8)$$

In the policy above, $\mathbb{R}+$ indicates all positive real numbers, E indicates the Expectation value, $\lambda_b$ is the total traffic intensity in the non-prioritized baseline system in packets per second, $B_b$ is the bandwidth of the non-prioritized baseline system, α is a bandwidth scaling parameter that connects the bandwidth of the prioritized system B to the bandwidth of non-prioritized baseline system $B_b$, c is a constant that turns the proportionality relation in (1) to an equality and is connected to the network costs, F=320 KB is the size of the file being downloaded (which may be considered constant) and S is a random variable representing the spectral efficiency of the wireless network which may be determined by simulation. For example, simulating a two-ring, tree-sectored wireless network with wraparound, path-loss and shadow fading, uniform mobile terminal 130 distribution, and full-power transmission at each sector, we obtain:

$$\mathrm{E}\left\{\frac{1}{S}\right\} \approx 0.81 \text{ and } \mathrm{E}\left\{\left(\frac{1}{S}\right)^2\right\} \approx 1.04. \quad (9)$$

However, these equations are provided to illustrate a particular example embodiment. Example embodiments may vary and are not limited to the equations shown above.

A baseline load $\rho_b$ can be solved for using equation (7) above:

$$\rho_b = \lambda_b \mathrm{E}\left\{\frac{F}{B_b \cdot S}\right\}.$$

For a certain baseline load $\rho_b$, any total traffic intensity ($\lambda_b$) can be made possible by properly scaling the baseline bandwidth $B_b$.

As shown above in equation (6), the average delay time is based on an average service time $\overline{X_n}$ and an average waiting time. The average service time generally depends on the mobile terminal's 130 file size and realized Signal to Interference plus Noise Ratio (SINR). The SINR distribution may be induced by a wireless network geometry incorporating path loss and shadow fading, and is represented by the random variable S in the equations above.

If the pricing policy is based on average delay, such as Pricing Policy 1, uniform allocation may perform nearly as well as an optimal distribution calculated using the equations above. Therefore, the queue controller 210 may use a uniform allocation to distribute mobile terminals 130 amongst the priority queues, instead of calculating the traffic intensity associated with each priority queue ($\lambda_1, \lambda_2 \ldots, \lambda_N$). This may simplify S320 above, for example, as the queue controller 210 may evenly distribute the total traffic intensity ($\lambda_b$) into each priority queue.

Policy 2: P-th percentile Delay

In Policy 2, the fractional traffic intensities ($\lambda_1, \lambda_2 \ldots, \lambda_N$) and the P-th percentile delays $T_1^P, T_2^P, \ldots, T_N^P$ are variables of the utility function:

$$\text{maximize } U(\lambda_1, \ldots, \lambda_N, T_1^P, \ldots, T_N^P) = c \sum_{i=1}^{N} \frac{\overbrace{\lambda_i}^{\text{Revenue}}}{T_i^P} \quad (10)$$

over $$\lambda_n \in \mathbb{R}^+, n = 1, \ldots, N \quad (11)$$

subject to:

$$\sum_{i=1}^{N} \lambda_i = \lambda_b \quad (12)$$

$$B = \alpha \cdot B_b, 0 < \alpha \le 1 \quad (13)$$

$$\underbrace{\sum_{i=0}^{\min\left\{\left\lfloor\frac{T_n^P}{\Delta t}\right\rfloor, N_S\right\}} \left(p_S[i] \cdot \left(1 - \rho_n e^{-\gamma_n \cdot (T_n^P - i \cdot \Delta t)}\right)\right)}_{\text{Probability Approximation for the P-th Percentile Delay}} \approx \mathbb{P}\{\tau_n \le T_n^P\} = P, \quad (14)$$

for $n = 1, 2, \ldots, N$

In Policy 2, $\mathbb{R}+$ indicates all positive real numbers and c, $\lambda_b$, B, α and $B_b$ are as defined in Policy 1. Moreover, $p_S[i]$, $N_S$ and $\Delta t$ are, respectively, the components, a number of components of a probability mass function (PMF) associated with a service time, and a resolution of the PMF associated with the service time. $p_S[i]$, $N_S$ and $\Delta t$ may be measured beforehand and stored in the computer system according to known methods.

The PMF of the service time may be computed using the simulation of the wireless network as described in Policy 1. $\tau_p$ is the random variable representing the delay for queue n. As an example, if the P-th percentile delay is the 95-th percentile delay, P=0.95 in equation (14).

The variables $\gamma_n$ and $\rho_n$ are calculated using statistics of the waiting time, for example using equations (27) and (28), which are discussed in greater detail below. For example, the probability density function (PDF) and cumulative distribution function (CDF) of the waiting times may be approximated by degenerated hyper-exponential distribution functions, as discussed below with regard "Statistics of the Waiting Time."

Policy 3: Percentile Truncated Average Delay

In Policy 3, the fractional traffic intensities ($\lambda_1, \lambda_2 \ldots, \lambda_N$), the average delays $T_1^{T_0}, T_2^{T_0}, \ldots, T_N^{T_0}$ of the prioritized queuing system truncated to the $P_0$-th percentile delay $T_0$ of the non-prioritized baseline system, and fractions of traffic $P_1, P_2, \ldots, P_N$ in each priority queue with delays less than $T_0$ are variables of the utility function:

$$\text{maximize } U(\lambda_1, \ldots, \lambda_N, P_1, \ldots, P_N, \overline{T}_1^{T_0}, \ldots, \overline{T}_N^{T_0}) = c \sum_{i=1}^{N} \overbrace{\frac{P_i \lambda_i}{\overline{T}_i^{T_0}}}^{Revenue} \quad (15)$$

over $$\lambda_n \in \mathbb{R}^+, n = 1, \ldots, N \quad (16)$$

subject to:

$$\sum_{i=1}^{N} \lambda_i = \lambda_b \quad (17)$$

$$B = \alpha \cdot B_b, \; 0 < \alpha \leq 1 \quad (18)$$

$$\underbrace{\sum_{i=0}^{\min\left\{\left\lfloor \frac{T_0}{\Delta t} \right\rfloor, N_S\right\}} (p_S[i] \cdot (1 - \rho_0 e^{-\gamma_0 \cdot (T_0 - i \cdot \Delta t)}))}_{\text{Probability Approximation for the } P_0\text{-th Percentile Delay}} \approx \mathbb{P}\{\tau_0 \leq T_0\} = P_0, \quad (19)$$

(Non-prioritized, baseline system)

$$P_n = \mathbb{P}\{\tau_n \leq T_0\} \approx \underbrace{\sum_{i=0}^{\min\left\{\left\lfloor \frac{T_0}{\Delta t} \right\rfloor, N_S\right\}} (p_S[i] \cdot (1 - \rho_n e^{-\gamma_n \cdot (T_0 - i \cdot \Delta t)}))}_{\text{Probability Approximation for the } P_n\text{-th Percentile Delay}}, \quad (20)$$

$n = 1, 2, \ldots, N,$ $$\overline{T}_n^{T_0} \approx \underbrace{\sum_{i=0}^{\min\left\{\left\lfloor \frac{T_0}{\Delta t} \right\rfloor, N_S\right\}} \left[ p_{S,n}[i] \cdot \left( \frac{(1-\rho_n) \cdot i \cdot \Delta t}{1 - \rho_n e^{-\gamma_n \cdot (T_0 - i \cdot \Delta t)}} + \ldots + \frac{\rho_n \cdot (1 + \gamma_n \cdot i \cdot \Delta t - (1 + \gamma_n T_0) \cdot e^{-\gamma_n \cdot (T_0 - i \cdot \Delta t)})}{\gamma_n \cdot (1 - \rho_n e^{-\gamma_n \cdot (T_0 - i \cdot \Delta t)})} \right) \right]}_{\text{Truncated Average Approximation}}, \quad (21)$$

$n = 1, \ldots, N.$

In Policy 3, $c, \lambda_b, B, \alpha, B_b, p_S[i], N_S, \Delta t, \gamma_n, \rho_n$ and $\tau_n$ are as defined in Policy 1 and Policy 2. The variables $\gamma_0$ and $\rho_0$ are also calculated using statistics of the waiting time as discussed in Policy 2, and $\tau_0$ is the random variable representing the delay for the baseline, non-prioritized system. As an example, if the $P_0$-th percentile delay is the 95-th percentile delay, $P_0 = 0.95$ in equation (19).

While example embodiments have been particularly shown and described, it will be understood by one of ordinary skill in the art that variations in form and detail may be made therein without departing from the spirit and scope of the claims.

Statistics of the Waiting Time

As discussed above, the variables $\gamma_n$ and $\rho_n$ are calculated using statistics of the waiting time. For example, the probability density function (PDF) and cumulative distribution function (CDF) of the waiting times may be approximated by degenerated hyper-exponential distribution functions. However, example embodiments may vary and are not limited to the example embodiments discussed above.

The Laplace-Stieltjes transform (LST) of the waiting time distribution function may be given by:

$$W*(s) = \frac{(1 - \lambda s)s}{s - \lambda + \lambda B*(s)} \quad (22)$$

A closed form expression for the waiting time LST requires the service time LST, $B*(s)$, to be known. Unfortunately, an analytically tractable expression for $B*(s)$ is not known. Hence, we may use degenerated hyper-exponential distributions to approximate the PDF and CDF for the waiting time. However, as discussed above, these equations are provided to illustrate a particular example embodiment. Example embodiments may vary and are not limited to the equations shown.

In this sense, we have for the PDF:

$$f_W(w) = \begin{cases} (1 - \rho)\delta(w) + \rho\gamma e^{-\gamma w}, & \text{for } w \geq 0 \\ 0, & \text{elsewhere} \end{cases}, \quad (23)$$

with $\gamma \geq 0$ and $0 \leq \rho \leq 1$, where $\delta(w)$ is the Dirac delta function.

Moreover, the CDF is given by $$F_W(t) = P\{W \leq t\} = \int_0^t f(w)dw = \begin{cases} 1 - \rho e^{-\gamma t}, & \text{for } t \geq 0 \\ 0, & \text{elsewhere} \end{cases}, \quad (24)$$

with $t, \gamma \geq 0$ and $0 \leq \rho \leq 1$,

In a prioritized system, the PDF and CDF of the waiting times of each class $n=1, 2, \ldots N$ can be modeled by a version of the functions above, i.e.:

$$f_{W,n}(w) = \begin{cases} (1-\rho_n)\delta(w) + \rho_n\gamma_n e^{-\gamma_n w}, & \text{for } w \geq 0 \\ 0, & \text{elsewhere} \end{cases} \quad (25)$$

with $\gamma_n \geq 0$ and $0 \leq \rho_n \leq 1$, $$F_{W,n}(t) = P\{W_n \leq t\} = \begin{cases} 1 - \rho_n e^{-\gamma_n t}, & \text{for } t \geq 0 \\ 0, & \text{elsewhere} \end{cases} \quad (26)$$

with $\gamma_n \geq 0$ and $0 \leq \rho_n \leq 1$, where the parameters and can be computed as $$\rho_n = \frac{2\overline{W_n}^2}{\overline{W_n^2}}, \quad (27)$$

and $$\gamma_n = \frac{2\overline{W_n}}{\overline{W_n^2}}, \quad (28)$$

where $\overline{W_n}$ is the average waiting time for class n, and the second moment of the waiting time $\overline{W_n^2}$ for class is given as:

$$\overline{W_n^2} = \frac{\sum_{i=1}^N \lambda_i \overline{X_i^3}}{3\left(1 - \sum_{i=1}^{n-1} \lambda_i \overline{X_i}\right)^2 \left(1 - \sum_{i=1}^{n} \lambda_i \overline{X_i}\right)} + \frac{\left(\sum_{i=1}^n \lambda_i \overline{X_i^2}\right)\left(\sum_{i=1}^N \lambda_i \overline{X_i^2}\right)}{2\left(1 - \sum_{i=1}^{n-1} \lambda_i \overline{X_i}\right)^2 \left(1 - \sum_{i=1}^{n} \lambda_i \overline{X_i}\right)^2} + \frac{\left(\sum_{i=1}^{n-1} \lambda_i \overline{X_i^2}\right)\left(\sum_{i=1}^N \lambda_i \overline{X_i^2}\right)}{2\left(1 - \sum_{i=1}^{n-1} \lambda_i \overline{X_i}\right)^3 \left(1 - \sum_{i=1}^{n} \lambda_i \overline{X_i}\right)}, \quad (29)$$

and $\overline{X_n}$, $\overline{X_n^2}$, $\overline{X_n^3}$, $n=1, \ldots, N$, are, respectively, the averages, the second moments and the third moments of the service times. Moreover, $\overline{X_n}$, $\overline{X_n^2}$, $n=1, \ldots, N$, are given by equations (7) and (8), respectively, and $\overline{X_n^3}$ is given as:

$$\overline{X_n^3} = E\left\{\left(\frac{F}{B \cdot S}\right)^3\right\} = \frac{F^3}{B^3} \cdot E\left\{\frac{1^3}{S}\right\}, n=1, \ldots, N, \quad (30)$$

with $$E\left\{\frac{1^3}{S}\right\} \approx 7.75 \quad (31)$$

However, these equations are provided to illustrate a particular example embodiment. Example embodiments may vary and are not limited to the equations shown above.

Observe that the conditions $\gamma_n \geq 0$ and $0 \leq \rho_n \leq 1$ implies that $$2\overline{W_n}^2 \leq \overline{W_n^2}, \overline{W_n} \geq 0 \text{ and } \overline{W_n^2} \geq 0, f \text{ or } n=1,2,\ldots,N \quad (32)$$

must be fulfilled in order for the approximation by the degenerated hyper-exponential distribution to be valid. Moreover, choosing $\gamma_n$ and $\rho_n$ as (27) and (28), respectively, the average and second moment of $f_{W,n}(w)$ are equal to $\overline{W_n}$ and $\overline{W_n^2}$, $n=1, \ldots, N$, respectively.

Because the delay is defined as $T_n = (1/\mu_n) + W_n$ (i.e., the sum of waiting time and service time), its PDF is given by the convolution of the waiting time PDF with the service time distribution function:

$$f_{T,n}(t) = f_{W,n(t)} * f_{S,n}(t). \quad (33)$$

For numeric computation purposes, we consider the PDF of the service time to be sampled to a discrete probability mass function (PMF) of sufficient resolution, i.e.:

$$P_{S,n}(k \cdot \Delta t) = \sum_{i=0}^{N_S} p_{S,n}[i] \cdot \delta(k-1), k=0,1,\ldots,N_S, \quad (34)$$

where $\Delta t$ is the time resolution of the PMF, $N_S$ is the number of components in the PMF, $\delta(\cdot)$ is the Dirac delta function and $n=1, 2, \ldots, N$.

Hence, the convolution in equation (33) can be written as:

$$f_{T,n}(t) = \sum_{i=0}^{N_S} p_{S,n}[i] \cdot f_{W,n}(t - i \cdot \Delta t). \quad (35)$$

Therefore, the CDF of the delays are given by:

$$F_{T,n}(t) = P\{T_n \leq t\} \quad (36)$$

$$= \int_0^t f_{T,n}(\tau) d\tau$$

$$= \int_0^t \sum_{i=0}^{\min\{\lfloor \frac{t}{\Delta t} \rfloor, N_S\}} p_{S,n}[i] \cdot f_{W,n}(\tau - i \cdot \Delta t) d\tau$$

$$= \sum_{i=0}^{\min\{\lfloor \frac{t}{\Delta t} \rfloor, N_S\}} \left(p_{S,n}[i] \cdot \int_{i \cdot \Delta t}^t f_{W,n}(\tau - i \cdot \Delta t) d\tau\right)$$

$$= \sum_{i=0}^{\min\{\lfloor \frac{t}{\Delta t} \rfloor, N_S\}} \left(p_{S,n}[i] \cdot \int_{i \cdot \Delta t}^t (1-\rho_n)\delta(\tau - i \cdot \Delta t) + \rho_n \gamma_n e^{-\gamma_n \cdot (\tau - i \cdot \Delta t)} d\tau\right)$$

$$= \sum_{i=0}^{\min\{\lfloor \frac{t}{\Delta t} \rfloor, N_S\}} (p_{S,n}[i] \cdot (\rho_n e^{-\gamma_n \cdot (t - i \cdot \Delta t)}))$$

What is claimed is:

1. A method of operating a network, the method comprising:
receiving a measurement of total traffic intensity;
receiving an expected quality of service associated with a packet;
determining a traffic intensity associated with respective ones of two or more priority queues and a delay metric associated with the respective ones of the two or more priority queues based on the measurement of total traffic intensity, the two or more priority queues having different delay metrics associated therewith;
assigning the packet to one of the two or more priority queues based on the expected quality of service and the determined traffic intensity associated with the respective ones of the two or more priority queues; and
determining a price of service for the packet based on the determined delay metric associated with the one of the two or more priority queues assigned to the packet.

2. The method of claim 1, further comprising:
switching the packet to the one of the two or more priority queues by a switch.

3. The method of claim 1, further comprising:
measuring the total traffic intensity,
wherein the receiving receives the measured total traffic intensity.

4. The method of claim 1, wherein the expected quality of service includes a requested priority from a user, the requested priority being one of two or more priority levels from which the user selects.

5. The method of claim 4, wherein the receiving the expected quality of service associated with the packet further comprises:

receiving an expected quality of service associated with a mobile terminal;

receiving the packet from the mobile terminal; and associating the packet with the expected quality of service associated with the mobile terminal.

6. The method of claim 1, wherein the delay metric is an average delay and the determining the price determines the average delay based on an average service time and an average waiting time.

7. The method of claim 1, wherein the delay metric is a P-th percentile delay and the determining the price determines the P-th percentile delay based on a probability approximation including a waiting time for the one of two or more priority queues, a number of components of a probability mass function (PMF) associated with a service time, and a resolution of the PMF associated with the service time.

8. The method of claim 1, wherein the delay metric is a truncated average delay approximation and the determining the price determines the truncated average delay approximation based on a waiting time for the one of two or more priority queues and a delay for the non-prioritized system.

9. A network, the network comprising:
a queue controller configured to,
  receive a measurement of total traffic intensity,
  receive an expected quality of service associated with a packet,
  determine a traffic intensity associated with respective ones of two or more priority queues and a delay metric associated with the respective ones of the two or more priority queues based on the measurement of total traffic intensity, the two or more priority queues having different delay metrics associated therewith,
  assign the packet to one of the two or more priority queues based on the expected quality of service and the determined traffic intensity associated with the respective ones of the two or more priority queues, and
  determine a price of service for the packet based on the determined delay metric associated with the one of two or more priority queues assigned to the packet.

10. The network of claim 9, further comprising:
a switch configured to switch the packet to the one of two or more priority queues.

11. The network of claim 9, further comprising:
a traffic intensity measurement device configured to measure the total traffic intensity and to transmit the total traffic intensity to the queue controller.

12. The network of claim 9, wherein the expected quality of service includes a requested priority from a user, the requested priority being one of two or more priority levels from which the user selects.

13. The network of claim 12, wherein the queue controller is further configured to receive an expected quality of service associated with a mobile terminal, to receive the packet from the mobile terminal and to associate the packet with the expected quality of service associated with the mobile terminal.

14. The network of claim 9, wherein the delay metric is an average delay and the queue controller is configured to determine the average delay based on an average service time and an average waiting time.

15. The network of claim 9, wherein the delay metric is a P-th percentile delay and the queue controller is configured to determine the P-th percentile delay based on a probability approximation including a waiting time for the one of two or more priority queues, a number of components of a probability mass function (PMF) associated with a service time, and a resolution of the PMF associated with the service time.

16. The network of claim 9, wherein the delay metric is a truncated average delay approximation and the queue controller is configured to determine the truncated average delay approximation based on a waiting time for the one of two or more priority queues and a delay for the non-prioritized system.

* * * * *